Sept. 6, 1960 YOSHIMITSU KIKUCHI 2,951,810

FERRITE

Filed Feb. 6, 1958 3 Sheets-Sheet 1

INVENTOR.
YOSHIMITSU KIKUCHI

BY Ralph B. Pastoriza

ATTORNEY

*INVENTOR.*
YOSHIMITSU KIKUCHI
*BY* Ralph B. Pastoriza
*ATTORNEY*

FERRITE

Filed Feb. 6, 1958 3 Sheets-Sheet 3

INVENTOR.
YOSHIMITSU KIKUCHI
BY Ralph B. Pastoriza
ATTORNEY

United States Patent Office 2,951,810

Patented Sept. 6, 1960

1

2,951,810

FERRITE

Yoshimitsu Kikuchi, Research Institute of Electrical Communication, Tohoku University, Sendai, Japan Filed Feb. 6, 1958, Ser. No. 713,577

Claims priority, application Japan Feb. 16, 1957

3 Claims. (Cl. 252—62.5)

This invention relates to improved magnetostriction vibrators and to methods of making them.

Magnetostriction vibrators are substances which change their physical dimensions under the influence of a magnetic field and are useful, for example, in transducing electrical energy to acoustical energy. The electromechanical coupling factor of a magnetostriction vibrator is a co-efficient which serves as a measure of the efficiency of the particular material effecting the transformation of electrical energy into mechanical energy. In the present specification, this coupling factor is designated $k$ and is expressed in percent.

Conventional magnetostriction vibrators are usually formed from thin sheets of pure nickel or alloys. These sheets are first processed to provide insulation on their surfaces and then laminated together into the desired final shape of the vibrator. Not only are the thin laminated sheets themselves expensive, but considerable time and labor is involved in processing and assembling these sheets. Further, the finished products do not exhibit good sharpness of mechanical resonance or high coupling factors and still suffer from eddy current losses notwithstanding the laminations.

Bearing the above in mind, it is a primary object of the present invention to provide a method of making improved magnetostriction vibrators which is considerably less expensive from a time and labor standpoint than present day methods.

Another object is to provide a vibrator in accordance with the method which avoids the time consuming labor of insulating and laminating thin sheets as is presently done in providing metallic vibrators.

Still other objects of the invention are to provide an improved magnetostriction vibrator, formed in accordance with the method, which has high electrical resistance and thus negligible eddy current loss, a relatively high electromechanical coupling factor approaching and even exceeding that of pure nickel, and which exhibits a sharp mechanical resonance characteristic as compared to conventional vibrators of the present time.

These and other objects and advantages of the present invention are attained by providing a vibrator composed of a sintered mixture of certain metallic oxides rather than laminated sheets. The chemical composition of the mixture comprises by weight from .5 to 65 mol-percent of copper oxide; .1 to 68 mol-percent of nickel oxide; .1 to 20 mol-percent of cobalt oxide; and 30 to 60 mol-percent of ferric oxide.

In accordance with the method of the invention, the various metallic oxides are pulverized and mixed together in proper proportions in accordance with the above noted ranges. After the pulverized oxides have been thoroughly mixed, the mixture is heated to substantially 1000° C. to effect a preliminary sintering. After the preliminary sintering, the mixture is then repulverized into a fine powder. The powder is then molded into a desired shape or block. This block is then sintered at a temperature between 900° C. and 1400° C. for anywhere from one-half to three hours in the presence of air. After the sintering process, the block is carefully cooled at a rate of from 5° C. to 10° C. per minute down to the ambient temperature. This method produces a solid solution of metal oxides which provide magnetostriction vibrators of excellent qualitites. Further, the vibrators can readily be produced by industry to have relatively uniform characteristics in spite of deviations from the specified chemical compositions which may be unavoidable. The resulting vibrators are not only useful in the audio frequency range but are also capable of operation at several megacycles.

A better understanding of the improved qualities exhibited by the magnetostriction vibrators produced in accordance with the foregoing method will be had by referring to the accompanying drawings in which.

Figure 3:
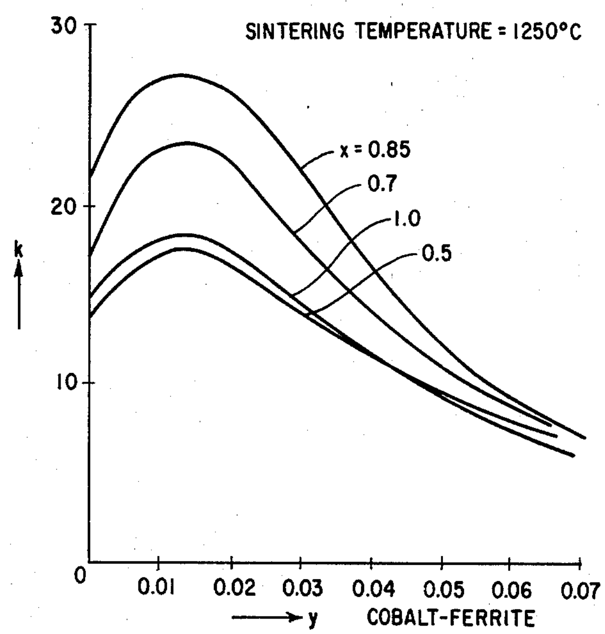
Figure 4:
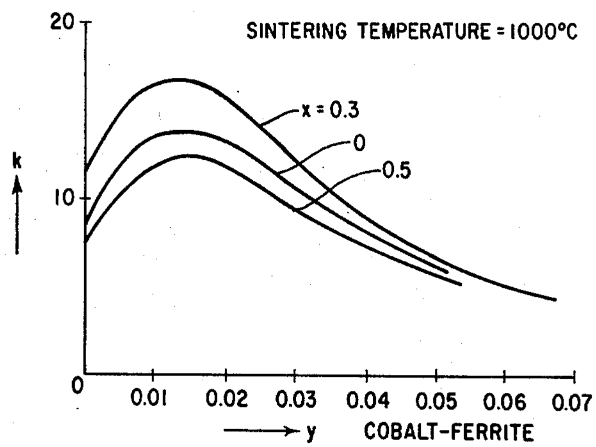
Figure 5:
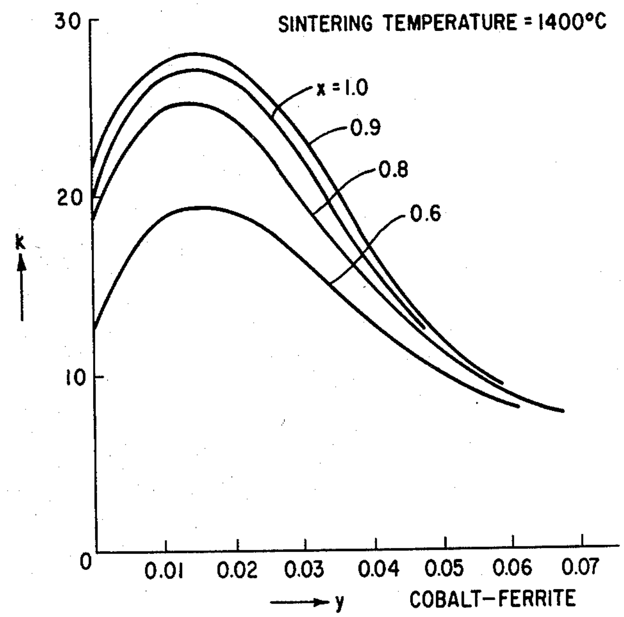
Figure 6:
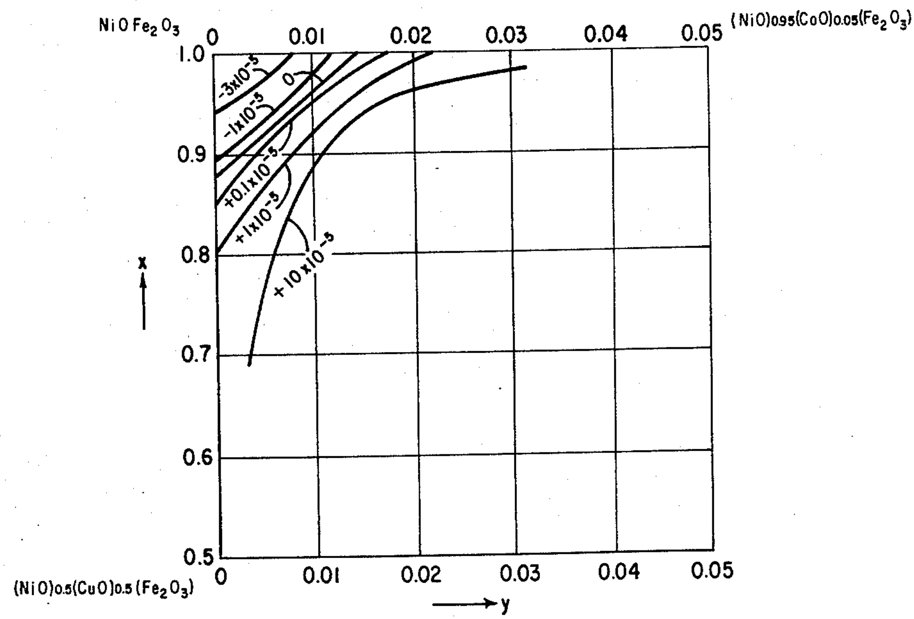

Figures 3, 4, and 5, respectively, illustrate characteristic curves indicating the variations in the electromechanical coupling factor with different sintering temperatures; and, Figure 6 illustrates characteristic curves of the temperature coefficient of mechanical resonant frequency.

In representing the improved characteristics of the magnetostriction vibrator in the accompanying figures, the following equation represents the mixture:

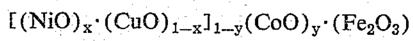

$$[(NiO)_x \cdot (CuO)_{1-x}]_{1-y}(CoO)_y \cdot (Fe_2O_3)$$

In this expression, the mol-percent of ferric oxide is 50 which means that half of the entire mixture by mol weight constitutes ferric oxide. The other half of the mixture is made up of varying proportions of nickel oxide, copper oxide, and cobalt oxide, these respective proportions being indicated by the subscripts $x$, $1-x$, $1-y$, and $y$. For example, the relative proportions of nickel oxide and copper oxide are determined by the value of $x$ such that these two oxides taken together constitute a sub-mixture. This sub-mixture has a proportion with respect to the cobalt oxide determined by the value of $y$ such that the sub-mixture when added to the cobalt oxide totals 50 mol-percent which in turn when added to the given 50 mol-percent of the ferric oxide constitutes a 100 mol-percent quantity constituting the complete mixture. In the accompanying curves of the drawings, the various ranges defining the proportions of the various oxides can thus be expressed by the parameters $x$ and $y$.

Figure 1:
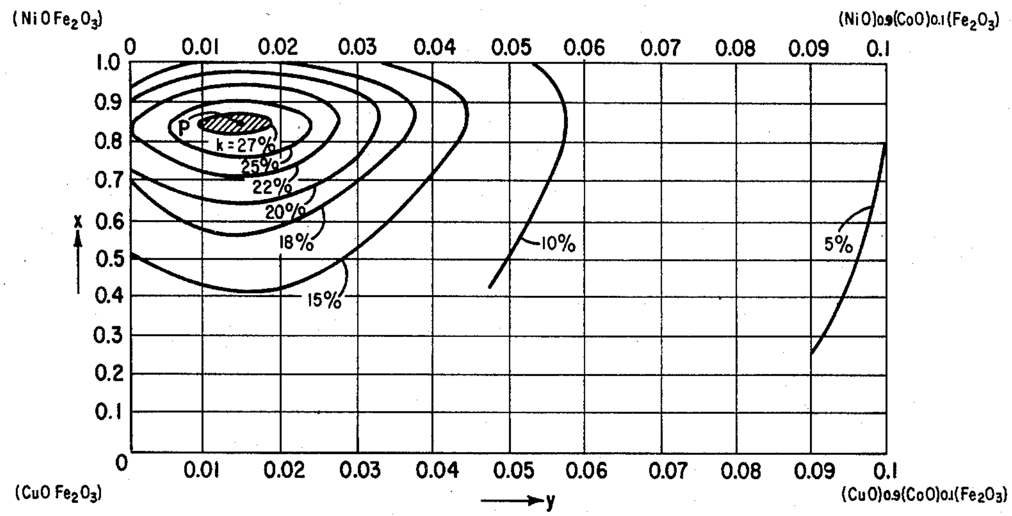
Figure 1 illustrates characteristic curves indicating the electromechanical coupling factor $k$ as a function of varying the content of the nickel, copper, and cobalt oxides in a given amount of ferric oxide.

Referring now to Figure 1, there is illustrated the electromechanical coupling factor $k$ of oxides whose composition is represented by the above formula which has been sintered at 1250° C. for three hours. Measurements have been made at each optimum bias magnetic field. As shown in the drawing, the electromechanical coupling factor $k$ increases with the increase of the cobalt oxide content, and reaches its maximum at $y=0.015$. This maximum point is indicated at P in the drawing and is equivalent to about 75 mol percent. It will then be noted that the coupling factor falls below 5 percent when the mol-percent content of cobalt oxide approaches 5 that is, when $y=0.1$.

Figure 2:
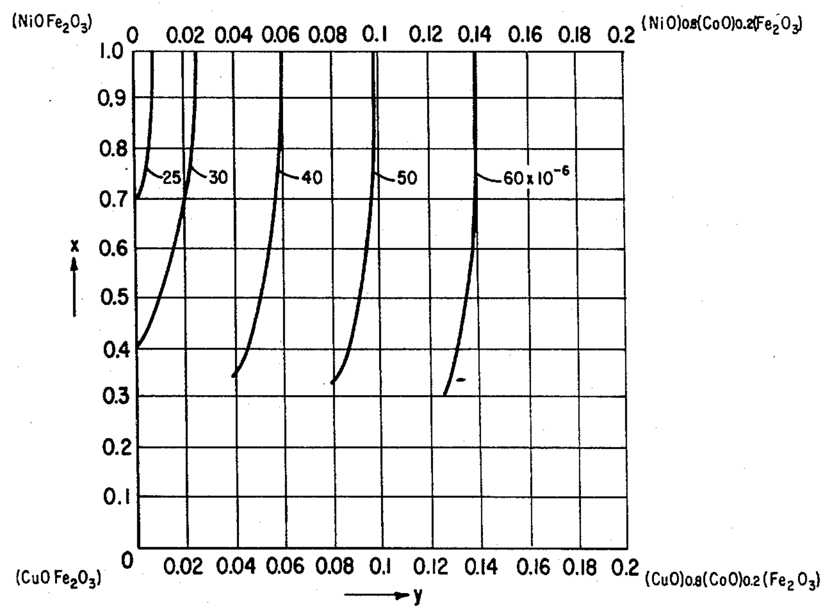
Figure 2 shows characteristic curves indicating the magnetostriction saturation characteristics for the range of the same chemical compositions as that of Figure 1.

Referring now to Figure 2, it will be noted that the magnetostriction saturation increases with increases in the content of cobalt oxide. Therefore, the material in this region is very useful for providing intense vibrators. Thus, considering Figures 1 and 2 together, the range of content of cobalt oxide which lies between .1 mol-percent and from 5 to 10 mol-percent is very effective. Actually, effective results are attained when the cobalt oxide mol-percent approaches 20 for certain applications.

In Figures 3, 4 and 5 there are shown curves representing the electromechanical coupling factor $k$ with respect to changes in the mixture as expressed by the parameter $y$. From the mixture equation given above, the variation in $y$ thus represents a variation in the proportional content of the cobalt oxide. In Figure 3, the sintering temperature was 1250° C. for a period of three hours. It will be noted that the factor k reaches its maximum value in a region where there is a comparatively small amount of cobalt oxide with respect to the quantity of the nickel and copper oxide mixture. Again, from this result it appears that the preferred range of cobalt oxide content lies between .1 and 5 to 10 mol-percent. However, it is found that a mol-percent approaching 20 is effective. Figure 4 illustrates curves similar to those of Figure 3 wherein the sintering temperature is at 1000° C. for three hours while Figure 5 represents the variation in coupling factor for a sintering temperature of 1400° C. for three hours. In these latter two drawings, it will also be apparent that the coupling factor attains its maximum value when only a comparatively small amount of cobalt oxide is added to the nickel-copper oxide mixture.

The addition of copper oxide in the mixture results in a lowering of the sintering temperature and also an improvement in the magnetic and mechanical uniformity of the final products. When the content of copper oxide is over 50 mol-percent, the electromechanical coupling factor $k$ decreases; nevertheless, material produced in this range is useful in producing transducers which are relatively less expensive inasmuch as a lower sintering temperature is employed and there is less content of nickel, the latter metal being relatively expensive. However, these latter transducers do not have a very large electromechanical coupling factor; but this is not a deterrent since there are many applications which do not require large electromechanical coupling factors. For this reason, the upper limit of the range of copper oxide is chosen as 65 mol-percent.

The electromechanical coupling factor becomes relatively low when the content of the nickel oxide exceeds 68 mol-percent. Above 68 mol-percent of nickel oxide renders the effect of adding any cobalt oxide negligible and further the sintering temperature becomes too high.

Referring now to Figure 6, there are shown the temperature co-efficients of mechanical resonant frequency of the ferrite mixture for different mixture proportions as indicated by the parameters $x$ and $y$. It can be said that co-efficient values less than $3\times10^{-5}$ per degree centigrade can be easily attained throughout a comparatively large variation in the chemical composition. The co-efficients realizable fully meet the usual requirements for magnetostrictive mechanical type filters or self oscillators and thus there is wide application for the present product.

From the foregoing, it will be evident that the final products of which the magnetostriction vibrators are composed have excellent characteristics and can provide an electromechanical coupling factor $k$ up to 27 percent, or more, depending upon the particular composition and processing. The specific electrical resistance of the new magnetostriction vibrators lies between $10^4$ and $10^6$ ohm-cm. As a consequence, and as pointed out heretofore, the eddy current loss is essentially negligible and this fact enables a considerable saving in labor inasmuch as the usual type of insulated laminations need not be employed. Further, in conventional type vibrators made of pure nickel or other metals, the sharpness factor of mechanical resonance has usually been less than 50 because of the eddy current damping. In the new sintered oxide products of this invention, however, this sharpness factor usually lies between 1000 and 4000 and may even approach 10,000.

What is claimed is:

1. A method of producing an improved ferrite comprising the steps of: pulverizing oxides of copper, nickel, cobalt, and iron and forming a mixture thereof in the proportions of .5 to 65 mol-percent of copper oxide, .1 to 68 mol-percent of nickel oxide, .1 to 20 mol-percent of cobalt oxide, and 30 to 60 mol-percent of ferric oxide; heating said mixture to substantially 1000° C. to effect a preliminary sintering; repulverizing the mixture into a powder; molding the powder into a desired shaped block; sintering said block at 1000° to 1400° C. for one-half to three hours in air; and cooling said block at the rate of from 5° to 10° C. per minute to the ambient temperature.

2. A ferrite formed by a preliminary sintering of a pulverized mixture of .5 to 65 mol-percent copper oxide, .1 to 68 mol-percent of nickel oxide, .1 to 20 mol-percent of cobalt oxide, and 30 to 60 mol-percent of ferric oxide at a temperature of from 800° to 1200° C. for from one to three hours, said mixture then being repulverized to a powder, molded into a desired shaped block, sintered at 1000° to 1400° C. for one-half to three hours in air, and cooled at a rate of from 5° to 15° C. per minute to ambient temperature.

3. A ferrite formed by a preliminary sintering at substantially 1000° C. for substantially one hour of a pulverized mixture consisting of substantially: 41.87 mol-percent nickeloxide, 7.38 mol-percent copper oxide, .75 mol-percent cobalt oxide, and 50 mol-percent ferric oxide, said mixture then being repulverized to a powder, shaped into a desired shaped block, sintered at substantially 1250° C. for substantially two hours, and cooled at the rate of 5° to 10° C. per minute to ambient temperature whereby said block exhibits a magnetostriction electromechanical coupling factor of substantially 27%.

References Cited in the file of this patent

UNITED STATES PATENTS

| | | |
|---|---|---|
| 1,976,230 | Kato et al. | Oct. 9, 1934 |
| 2,723,239 | Harvey | Nov. 8, 1955 |
| 2,736,708 | Crowley | Feb. 28, 1956 |

FOREIGN PATENTS

| | | |
|---|---|---|
| 510,462 | Belgium | Apr. 30, 1952 |
| 748,070 | Great Britain | Apr. 18, 1956 |
| 752,156 | Great Britain | July 4, 1956 |

OTHER REFERENCES

Snoek: Physica III, No. 6, pp. 474–479, 481, 482, June 1936.

Forester et al.: Comptes Rendus, July 17, 1939, pp. 164–166.

Weil et al.: Comptes Rendus, Mar. 24, 1952, pp. 1351, 1352.

J. of the Institute of Electrical Engineers, Japan, November 1937, pp. 4, 5; June 1939, pp. 277–279.